United States Patent Office 3,455,954
Patented July 15, 1969

3,455,954
CYCLIC FLUOROCARBONATES
Julianne H. Prager, Arden Hills, Minn., assignor to Minnesota Mining & Manufacturing Company, St. Paul, Minn., a corporation of Delaware
No Drawing. Filed Mar. 31, 1966, Ser. No. 538,938
Int. Cl. C07d 11/00; C07c 69/00
U.S. Cl. 260—340.2                              5 Claims

ABSTRACT OF THE DISCLOSURE

Fluorinated organic cyclic carbonates having the formula

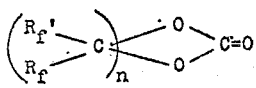

wherein $R_f$ and $R_f'$ are fluorine or perfluoroalkyl having 1 to 3 carbon atoms and $n$ is 2 or 3, are prepared by direct fluorination of corresponding organic cyclic carbonates at a temperature in the range of —100 to +100° C. The products are useful solvents, hydraulic fluids or dielectrics; when lower boiling, they are useful as refrigerants or aerosol propellants.

---

This invention relates to a new class of fluorine-containing organic compounds. More particularly, the invention concerns perfluorinated cyclic carbonates.

Partially fluorinated cyclic carbonates have been reported, e.g. the compound 1,2-difluoro-1,2-dimethylethylene carbonate having the structure

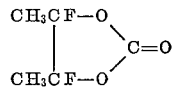

A perfluorinated acyclic carbonate, $(CF_3O)_2C=O$, is known. However, so far as is known, no cyclic carbonates which are substantially free of hydrogen have heretofore been prepared.

Objects of the invention are to provide certain cyclic fluorocarbonates, and a process for their preparation.

The present invention provides cyclic fluorocarbonates of the formula

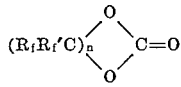

where $n$ is 2 or 3 and $R_f$ and $R_f'$ are the same or different and are fluorine or perfluoroalkyl. In another aspect, the invention also provides a method for making these adducts.

The compounds of the invention are colorless and range in properties from gases to volatile liquids to oils and waxy or crystalline solids. These perfluorinated cyclic carbonates are highly useful. The higher boiling materials are especially useful as solvents, since they contain fluorocarbon groups and the carbonate moiety. They are also useful as hydraulic fluids and dielectric fluids. The lower boiling materials are valuable as refrigerants and as aerosol propellants. The compounds of the invention have improved stability toward acids as compared with the above-noted hydrogen-containing cyclic carbonates.

The compounds of the invention are prepared by direct fluorination of organic cyclic carbonates, in many cases having structures and substituents corresponding to those desired in the final product. Thus, for example, the direct fluorination of 1,2-difluoro-1,2-dimethylethylene carbonate produces 1,2-difluoro-1,2-bis(trifluoromethyl)ethylene carbonate.

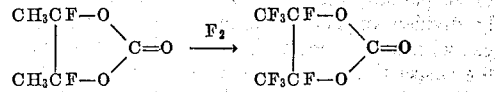

This is an especially advantageous example of the process since it requires not replacement of ring hydrogens by fluorine.

Partially fluorinated cyclic carbonates, such as the reactant shown above, can be obtained by the reaction or $COF_2$ with 1,2-diketones, as disclosed in the report of Fawcett et al., J. Am. Chem. Soc. 84, 4275 (1962).

Cyclic hydrocarbon 1,2-carbonates for use as starting materials can be obtained by reacting 1,2-dihydroxy compounds, such as ethylene glycol, 1,2-propanediol, 2-methyl-1,2-propanediol, 2-methyl-2,3-butanediol, 2,3-pentanediol, 2,3-butanediol, 3,4-dimethyl-3,4-hexanediol or the like with phosgene, or with dimethyl carbonate. 1,3-dihydroxy compounds, such as including 1,3-propanediol, 1,3-butanediol, 1,3-hexanediol, 2-ethyl-1,3-propanediol, 2,4-heptanediol, 5-methyl-2,4-heptanediol and 2-methyl-4,6-heptanediol can be employed similarly to prepare cyclic hydrocarbon 1,3-carbonates.

If ring fluorine atoms are to be introduced in the fluorination process, either by direct substitution of fluorine for ring hydrogen atoms exemplified by the following reaction

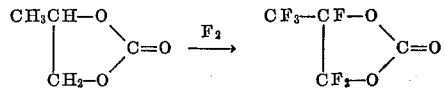

or by cleavage of alkyl groups with subsequent fluorination, for example

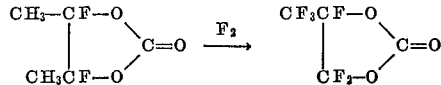

and

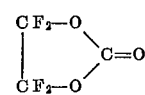

the yields of the desired fluorinated cyclic carbonates are lower.

Broadly speaking, the process of the invention comprises subjecting a cyclic hydrocarbon carbonate to the action of fluorine at a temperature in the range of from about —100° to +100° C., for a time sufficient to introduce into the reaction mixture at least the stoichiometric amount of fluorine necessary. Usually, an excess of fluorine is provided. The temperature selected is maintained by cooling or heating the reactor vessel, as required. The apparatus used is preferably constructed from Monel metal, nickel, brass, stainless steel or copper.

Solid, liquid or gaseous starting materials can be used. The selected reactant is placed in a suitable container with inert diluents or suspending media if desired, and fluorine is then introduced for a period ranging from about 30 minutes to about 6 to 12 hours and upwards, depending on the amount of starting material charged and the ease with which the fluorination is accomplished.

The fluorine and other gases used are conveniently introduced under slight positive pressure. Preferably, the fluorine is diluted with nitrogen or other inert gas such as argon, or helium, or a Freon, such as dichlorodifluoromethane and the like to give concentrations upward of about 0.1 percent to about 40 percent, but 100 percent fluorine in the gas stream, that is undiluted fluorine, can be used in many of the procedures described, using great caution and slow addition. The process can be carried out at atmospheric pressure or at greater pressures if desired.

If desired, an inert liquid diluent, acting as a solvent or suspending medium, can be used to suspend the finely divided oxygen-containing reactant, and the fluorine gas with or without a diluent gas is then bubbled through the suspension. Inert solid diluents, such as finely divided sodium fluoride, can also be used. In a similar manner, inert gases can be used as diluents for gaseous reactants.

Thus, for example, fluorine-inert liquids such as perfluorinated hydrocarbons, e.g. perfluorooctanes, perfluorohexanes, and the like; perfluorocyclohexane; perfluorinated cyclic ethers such as perfluorobutylfuran; perfluorinated tertiary amines such as tris - perfluoro - n-butylamines; and the like can be used as diluents.

Commercially obtainable fluorocarbons may contain an amount of material which is not inert toward fluorine, and in such cases, fluorine gas is passed through the selected fluorocarbon liquid for a time in small amounts just sufficient to render it substantially completely inert toward fluorine.

When an inert liquid diluent is employed in the process of the invention, the fluorinated reaction product generally dissolves in the diluent. The products can be recovered therefrom by fractional distillation, evaporation of the solvents after filtration, gas-liquid chromatography and the like.

In the procedure where no solvent is used, the desired products will be found in the reactor only if they are very high boiling. Otherwise, the effluent gas stream ordinarily contains the products, which are removed from the unreacted fluorine and diluent gas by condensation in a trap immersed in a coolant, such as liquid oxygen.

Generally speaking, once the process has gone to completion, no further fluorine reacts so that when the products are volatile and thus are swept into the cold trap, continuation of the flow of fluorine is not deleterious; but in the case of non-volatile solid or less volatile liquid products excessive exposure to fluorine should be avoided to eliminate the possibility that further or degradative reactions may occur.

The volatile products are isolated from the reaction mixtures or product trap by fractional condensation, employing traps cooled with Dry Ice, liquid air, ice-salt mixtures, and the like where the products are low-boiling and other appropriate temperature conditions where higher boiling liquids or solids are produced. It should be noted that for some purposes, the reaction product mixture can be used as such.

Separation and purification of the products of reaction is accomplished by chromatographic techniques in small scale runs; in larger runs, other known methods of fractionation such as distillation and liquid column chromatography can be used.

Example 1

A one-gram sample of 1,2 - difluoro - 1,2 - dimethyl-ethylene carbonate suspended in 40 cc. of perfluoro-tributylamine is fluorinated in a stirred, pressure reactor at 50 lbs. pressure with 40 percent fluorine in nitrogen, at —12° C. for 6 hours and then at 27° C. for 4.5 hours. A total of 18.7 grams of fluorine are introduced into the reactor. The volatile products are passed through a sodium fluoride scrubber to remove HF and then into a trap cooled in liquid oxygen. The contents of the trap are fractionated at reduced pressure through traps cooled with Dry Ice, a trichlorofluoromethane slush bath, and liquid nitrogen, respectively. The Dry Ice fraction was found to contain 1,2 - difluoro - 1,2 - bis (trifluoromethyl)ethylene carbonate, boiling at about 50° C. at pressures near atmospheric; as well as 4,5-bis (trifluoromethyl) - 4,5 - difluoro - 2 - fluoroxy - 1,3-dioxolane. The NMR spectrum of the fluorinated carbonate shows a broad multiplet at 79.9φ for the $CF_3$ groups and another broad multiplet at 132.5φ for the single fluorine atoms.

Example 2

Ethylene carbonate is fluorinated in a brass rectangularly-shaped box reactor having a sintered Monel plate suspended across it. The vessel is equipped with a gas inlet tube below the sintered plate and a gas outlet tube and brass blow-out cap above it. A 2.0 g. sample of ethylene carbonate is spread out on the sintered plate. The fluorination is carried out over a 4-day period.

During the first 24 hours, the reactor is cooled to about —70° C., flushed with nitrogen, 3 percent (volume) fluorine is introduced into the nitrogen stream and the gas mixture is passed through the reactor at a flow rate of .02 cubic ft./min. for 7 hours. The effluent stream is passed through an iron tube containing sodium fluoride at room temperature to remove hydrogen fluoride and then through a product trap immersed in liquid air to recover the volatile, entrained products. After 4 hours the temperature is raised to about —50° C. and the process continued at that temperature for three hours. The reactor is then purged with nitrogen for 1 hour, while warming to room temperature, and the product trap is removed. The reactor is capped and allowed to stand overnight. On the second day, a new trap is connected to the exit line. The reactor is cooled to about —50° C. and a stream of 7 percent (by volume) fluorine in nitrogen is employed at a rate of about .007 cubic ft./min. for 2 hours. For the next 5 hours, a concentration of 20 percent and a flow rate of about .008 cubic ft./min. are maintained. After 2 hours, the temperature is raised to —20° C. and the process is continued at that temperature for the rest of the 7 hour period. The reactor is then purged with nitrogen for 1 hour, while warming to room temperature, and the product trap is removed. The reactor is capped and allowed to stand at room temperature overnight. On the third day, a new product trap is connected. The reactor is cooled to about 0° C. and a stream of about 11 percent (by volume) fluorine in nitrogen is passed through at a rate of about .03 cubic ft./min. for 2 hours. For the next 5 hours a concentration of about 20 percent and a flow rate of about .008 cubic ft./min. are maintained. After 3 hours the reaction vessel is allowed to warm to room temperature (about 20° C.); the fluorination gas stream is continued during the warming and for the remainder of the 5 hour period. The reactor is purged with nitrogen for 1 hour, after which the product trap is removed. The reactor is capped and allowed to stand overnight. On the fourth day, a new product trap is connected. A stream of 24 percent (by volume) fluorine in nitrogen and a flow rate of .01 cubic ft./min. are maintained. After 1 hour at this concentration, the temperature is raised to about 38° C. and maintained there for 6 hours. The reactor is purged with nitrogen for 1 hour, while it is allowed to cool to room temperature.

A total of 2.50 moles of fluorine are used during the 4 day period.

The crude products are stored well below room temperature. They are found to contain a variety of products, which can be separated by trap-to-trap fractionation and vapor phase chromatography. Among these products is perfluoroethylene carbonate, a gas at room temperature.

Example 3

1,3-propylene carbonate having the formula

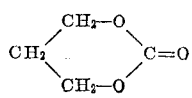

is fluorinated by the procedure of Example 2 to obtain perfluoro-1,3-propylene carbonate, having the formula

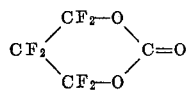

What is claimed is:
1. A compound of the formula

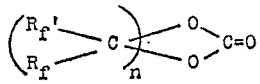

wherein $R_f$ and $R_f'$ are fluorine or perfluoroalkyl having 1 to 3 carbon atoms and $n$ is 2 or 3, and the compound contains at least 4 carbon atoms.

2. 1,2-difluoro-1,2-bis(trifluoromethyl)ethylene carbonate according to claim 1, having the formula

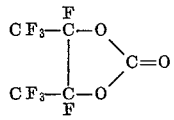

3. A process for the production of perfluorinated cyclic carbonates, which consists essentially of subjecting a compound of the formula

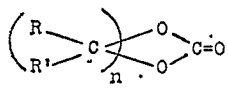

wherein R is hydrogen or lower alkyl and R' is hydrogen, fluorine or lower alkyl; and $n$ is 2 or 3, at a temperature in the range of $-100°$ to $+100°$ C. to the action of elemental fluorine for a period of time sufficient to introduce into the reaction mixture at least the stoichiometric amount of fluorine; and isolating from the reaction mixture a compound of the formula

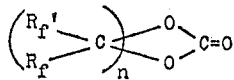

wherein $R_f$ and $R_f'$ are fluorine or perfluoroalkyl having 1 to 3 carbon atoms and $n$ is 2 or 3.

4. The process according to claim 3, in which the temperature of reaction is maintained below 0° C.

5. The process according to claim 3, in which the fluorine is mixed with a gaseous diluent inert towards fluorine and components of the reaction mixture.

References Cited

UNITED STATES PATENTS

| | | | |
|---|---|---|---|
| 2,816,287 | 12/1957 | Ellingboe et al. | 260—340.2 |
| 3,313,719 | 4/1967 | Springmann et al. | 260—340.2 |

OTHER REFERENCES

Fluorine Chemistry, ed. J. H. Simons, vol. 1, 1950, p. 377.

Fluorocarbons and Their Derivatives, by R. E. Banks, 1964, p. 6.

Fieser et al., Organic Chemistry, 3rd ed., 1956, p. 154.

HENRY R. JILES, Primary Examiner

S. D. WINTERS, Assistant Examiner

U.S. Cl. X.R.

252—69, 77, 305